Patented Sept. 29, 1925.

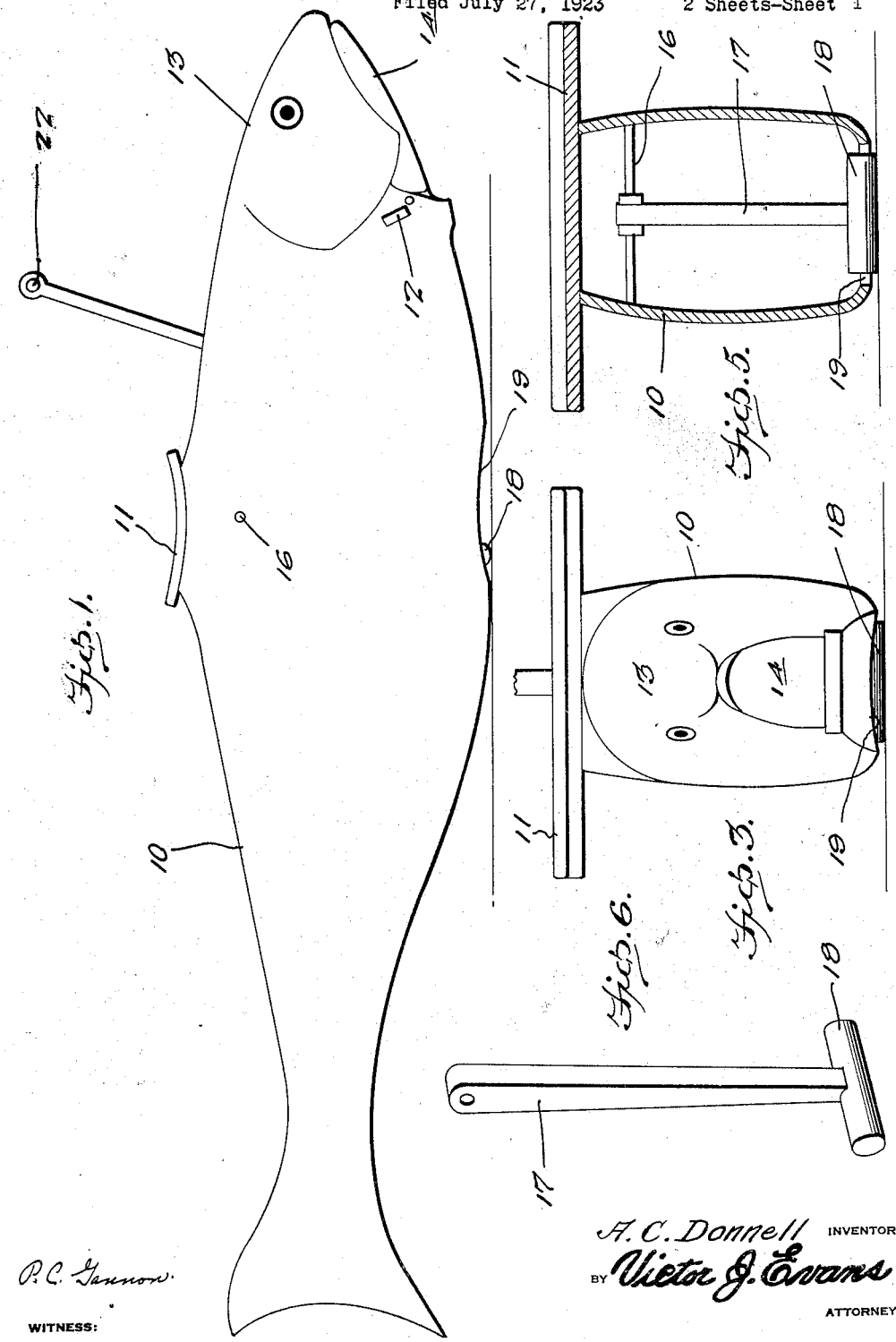

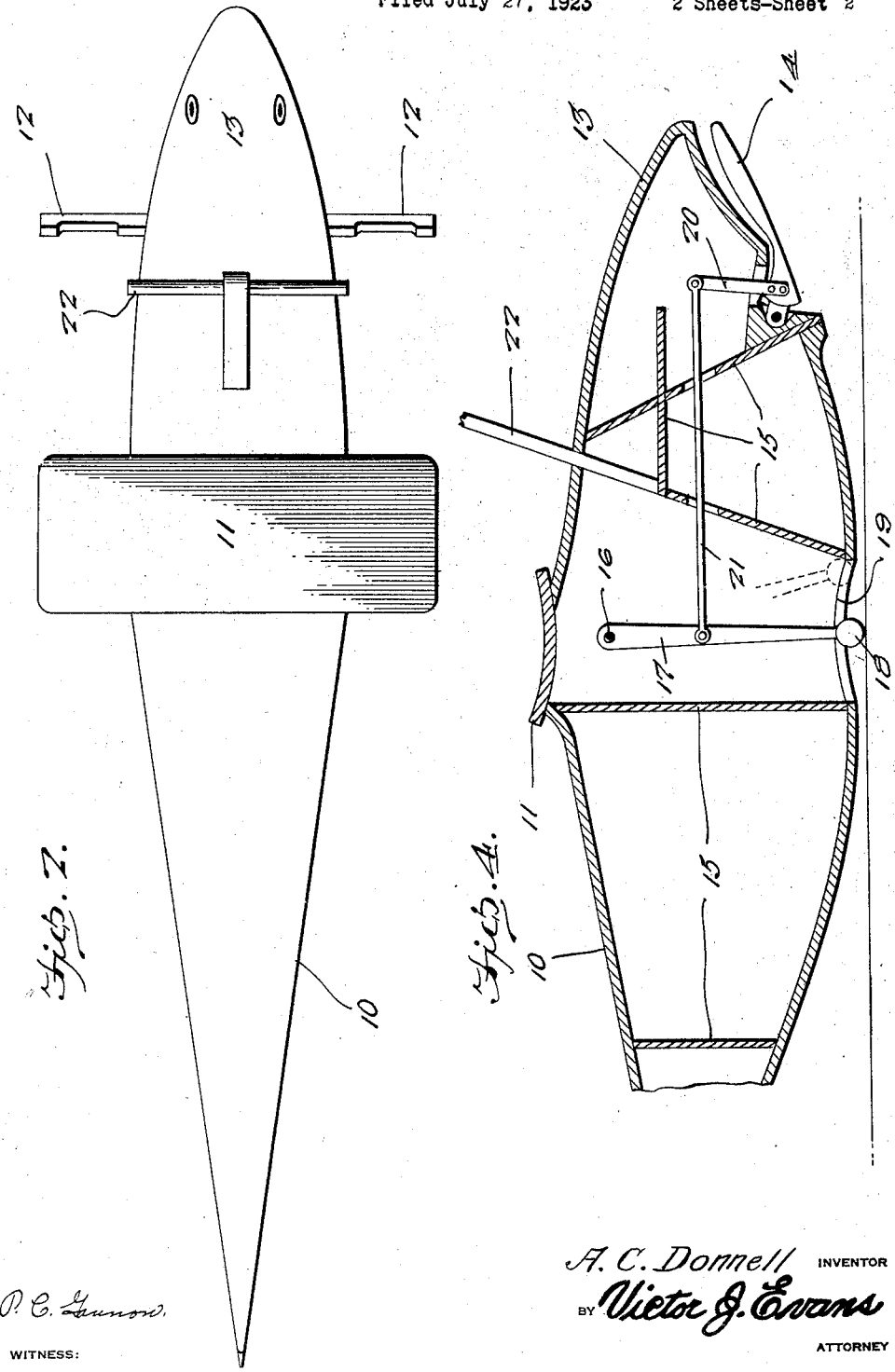

1,555,643

UNITED STATES PATENT OFFICE.

ALOLO C. DONNELL, OF WEIRTON, WEST VIRGINIA.

AMUSEMENT DEVICE.

Application filed July 27, 1923. Serial No. 654,224.

*To all whom it may concern:*

Be it known that I, ALOLO C. DONNELL, a citizen of the United States, residing at Weirton, in the county of Hancock and State of West Virginia, have invented new and useful Improvements in Amusement Devices, of which the following is a specification.

This invention relates to improvements in amusement devices and has for an object the provision of a toy, shaped to simulate a fish, or it may be of any other shape capable of being rocked and provided with means whereby a rocking motion will impart a step by step movement thereto, so that a child may sit upon the back of the fish or other object and by a rocking motion cause the same to move forward or backward.

Another object of the invention is the provision of a toy of this character having a movable mouth and means whereby movement of the toy will cause a simultaneous movement of the mouth so as to further add to the appearance and amusing features of the device.

With the above and other objects in view, the invention further includes the following novel features and details of construction, to be hereinafter more fully described, illustrated in the accompanying drawings and pointed out in the appended claim.

In the drawings:—

Figure 1 is an elevation of a fish shaped amusement device constructed in accordance with the invention.

Figure 2 is a plan view of the same.

Figure 3 is a front view.

Figure 4 is a longitudinal sectional view.

Figure 5 is a transverse section.

Figure 6 is a detail perspective view of the pivoted walking arm.

Referring in detail to the drawings wherein like characters of reference denote corresponding parts, the device which is shaped to conform to the shape and appearance of a large fish is indicated at 10. The fish is of a sufficient size to provide for the seating of a child and for this purpose is provided with a seat 11 and foot rests 12, the latter being arranged adjacent the head 13. The mouth of the fish is provided with a pivoted lower jaw 14.

The fish for a portion of its length is of hollow construction and is braced as indicated at 15, while pivotally mounted as shown at 16 within the body of the fish is an inverted substantially T-shaped arm 17 which is capable of a swinging pendulum-like movement. The lower end or cross bar 18 of this arm projects through an opening 19 provided in the belly of the fish and forms what may be termed a walking arm in that its length is sufficient to raise the body of the fish when the arm is in the full line position shown in Figure 4 of the drawings. As the belly of the fish is curved as shown, a rocking motion may be imparted to the said fish so that the arm 17 will swing to the forward dotted line position and the body of the fish raised and moved forward for an appreciable distance until the arm assumes the rear dotted line position, this operation being continued as long as the rocking movement occurs.

The lower jaw 14 has secured thereto an arm 20 which is connected by means of a rod 21 with the arm 17 so that when the latter is rocked upon the pivot 16 an opening or closing movement of the jaw 14 will be effected.

The device may be provided with a handle 22 to aid the rider in manipulating the device.

The invention is susceptible of various changes in its form, proportions and minor details of construction and the right is herein reserved to make such changes as properly fall within the scope of the appended claim.

Having described the invention, what is claimed is:—

A travelling toy comprising a horizontally disposed elongated hollow body having a longitudinally curved bottom and an opening in said bottom, a seat, a handle, an inverted substantially T-shaped arm having its upper end pivotally mounted within the body beneath the seat and its lower end extending through the opening with its horizontal portion disposed transversely beneath the body for engagement with a traction surface, whereby a rocking motion will impart a step by step movement to the body, a head at one end of the body, a mouth including a pivotally mounted lower jaw, an arm having one end rigid with the jaw and extending substantially at right angles to the head, a horizontally disposed rod having one end pivotally connected to the jaw carried arm and its opposite end pivotally connected to the T-shaped arm, whereby rocking movement of the body will operate the movable jaw.

In testimony whereof I affix my signature.

ALOLO C. DONNELL.